United States Patent Office

Re. 24,875

Reissued Sept. 27, 1960

24,875

METAL COATING COMPOSITIONS

Louis McDonald, Altadena, Calif., assignor to Kelite Corporation, Los Angeles, Calif., a corporation of California No Drawing. Original No. 2,885,312, dated May 5, 1959, Ser. No. 569,271, Mar. 5, 1956. Application for reissue July 2, 1959, Ser. No. 824,759

12 Claims. (Cl. 148—6.15)

Matter enclosed in heavy brackets [ ] appears in the original patent but forms no part of this reissue specification; matter printed in italics indicates the additions made by reissue.

This invention relates to protective coatings for metals and has particular reference to compositions for protecting metals from corrosion.

The art of preserving metals from corrosion and especially for protecting mild steels from rusting in transit from the mill, in storage prior to use and in cleaning and preparing for painting, is well established. Steel that is hot rolled leaves the rolling operation with an adherent film of scale which is comprised of certain oxides of iron. This film serves to protect the steel on a temporary basis from rusting while in transit and/or storage prior to use. However, before the steel can be used for any purposes which require an organic protective and/or decorative finish, it must be descaled by pickling, sandblasting, shotblasting or other descaling processes, and provided with a corrosion resistant conversion paint bond finish.

Steel that is cold rolled with a bright anneal or a black plate finish is highly susceptible to rusting and must be protected prior to use. Two methods of protection are widely used: one means is to protect the steel by coiling or wrapping or providing similar moisture barriers; the other is to protect by coating with oil usually derived from petroleum. Both methods of protection are costly to the producer and consumer alike. The wrapping of unoiled sheet steel adds from 5–8% to the cost of the steel. The protection provided is uncertain and temporary. The steel usually develops rust before fabrication or manufacture into parts or finished goods. Oiling provides better protection against corrosion but entails the double cost of applying the oil prior to shipment and the removal of the oil prior to use before parts can be fabricated and finished.

Finishing which includes cleaning, imparting corrosion coating and decorative or protective organic coating is usually comprised of the steps of degreasing, washing, scrubbing, electrocleaning or other means of removing oily soil and solid particle dirt, imparting a conversion rust inhibitory coating such as a phosphate coating, and finally applying an organic finish such as paint. The phosphate conversion coating provides certain protection from rusting before painting and further reduces galvanic corrosion after painting in the event of damage to the organic film. The before painting treatment is at best of temporary value insofar as inhibiting corrosion. Typical corrosion behavior data for unpainted cold roll steel of 1018 series are shown as follows:

HOURS ASTM SALT SPRAY BEFORE RUSTING
1018 COLD ROLL STEEL

| Cleaned and Degreased Stock | Mill Oiled Stock | Phosphate Coated Stock (150 mg./sq. ft.) |
|---|---|---|
| 0.30 | 0.50 | 1.0 |

It is readily seen that cleaned steel or steel oiled at the mill will not stand reasonable storage with exposure to the atmospheric elements. The general criteria is to allow 30 days of atmospheric exposure for each hour of ASTM salt spray time before rusting. This would mean 15 days of atmospheric exposure before rusting for mill oiled cold roll steel and 30 days maximum for heavily phosphatized steel. It is well-known that under certain atmospheric conditions rusting proceeds at an even more accelerated rate.

One of the principal objects of this invention is, therefore, to provide improved means for the protection of metals from corrosion.

Another object of this invention is to provide novel compositions for improving the weathering characteristics and corrosion behavior of mild (low carbon) steels.

Another, more specific, object of this invention is to provide a combined conversion-organic sealer coating for the protection of metals from corrosion.

Another object of this invention is to provide a conversion coating composition including a dry lubricant.

Other objects and advantages of this invention it is believed will be readily apparent from the following detailed description of preferred embodiments thereof.

It has now been discovered that improvement in weathering characteristics and improvement in corrosion behavior can be provided for mild (low carbon) steels and other metals by imparting a combined conversion-organic seal coating. One typical manner in which this is accomplished is by phosphatizing the steel in the presence of macromolecular substance which contains strong polar groupings and which is capable of forming a molecular compound at the interface of the steel. Substances of this class exhibit the generic formula:

$$(—R—X)_n$$

where *—R—X represents a polymerizable monomer in which —R— is a vinyl-substituted aryl group* [—R— is an organic grouping with a free valence capable of polymeric reaction] and X is a strong polar group such as a carboxylic acid group, carboxylic acid ammonium salt, sulfonic acid or phosphonic acid group capable of forming a molecular bond with a metal and *n* is an integer greater than 1.

Typical examples of preferred polymeric sealers are disclosed as follows:

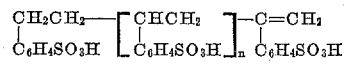

Polystyrene sulfonic acid

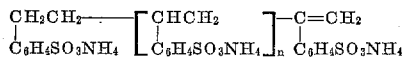

Polystyrene sulfonic acid ammonium salt

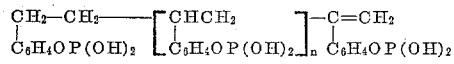

Polystyrene phosphonic acid

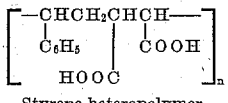

Styrene heteropolymer of maleic acid

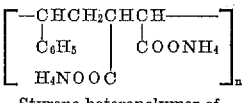

Styrene heteropolymer of ammonium maleate

It will be understood that metal complexes, such as polystyrene zinc ammonium sulfonate, may be employed, if desired.

The preferred polymers show molecular weights in the range of 7,200 to the order of 280,000.

The preferred macromolecular substances have strong polar groups capable of orienting to the surface of the metal, combining with or without the influence of heat, to form water insoluble metal organic and molecular compounds which strongly bond to the metal surface and fill the interstices of the conversion coating to form an organically sealed conversion coating. The organic, polymeric polar compound must be capable of exhibiting good solubility in the conversion coating bath at the concentrations and temperatures of operation and to co-deposit with the phosphate, chromate, chromate-fluoride or other conversion coating.

The following are examples of conversion coating baths embodying polymeric organic sealing agents:

Example 1

| Material component: | Weight percent |
|---|---|
| Orthophosphoric acid (75%) | 7.2 |
| Nitric acid (60%) | 2.0 |
| Zinc ammonium phosphate | 1.2 |
| Ferric nitrate | 0.1 |
| Polymeric styrene sulfonic acid ammonium salt (molecular wt. 122,000) | 1.2 |
| Water | 88.0 |

Example 2

| Material component: | Weight percent |
|---|---|
| Sodium acid pyrophosphate | 0.40 |
| Orthophosphoric acid (75%) | 0.15 |
| Manganese carbonate | 0.02 |
| Zinc phosphate | 0.01 |
| Ferric nitrate | 0.002 |
| Molybdic oxide | 0.005 |
| Sodium hemiphosphate | 0.25 |
| Heteropolymer of polystyrene diammonium maleate | 0.10 |
| Water | 99.063 |

Example 3

| Material component: | Weight percent |
|---|---|
| Polystyrene phosphonic acid | 0.10 |
| Orthophosphoric acid (75%) | 2.00 |
| Water | 97.90 |

Example 4

| Material component: | Weight percent |
|---|---|
| Polystyrene sulfonic acid ammonium salt | 0.6 |
| Orthophosphoric acid (75%) | 5.5 |
| Ethylene glycol monobutyl ether | 1.5 |
| Phenyl-polyoxyethylene alcohol | 0.05 |
| Water | 92.35 |

Example 5

| Material component: | Weight percent |
|---|---|
| Orthophosphoric acid (75%) | 7.5 |
| Heteropolymer of styrene maleic anhydride | 1.0 |
| Water | 91.5 |

Example 6

| Material component: | Weight percent |
|---|---|
| Polystyrene phosphonic acid | 0.60 |
| Water | 99.40 |

The average molecular weight of the polymeric organic sealing agents used in the above and the following examples was of the order of 122,000. As indicated by Example 6, the polymeric organic sealing agent functions as a conversion coating and is effective as such for either ferrous or no-ferrous metals.

Examples 1–5 illustrate conversion coating baths for the treatment of ferrous metals. It is apparent from these examples that the polymeric organic sealing agents are adapted to be used in combination with conventional conversion coating baths. As is well-known in the art, conversion coatings for ferrous metals include phosphates, such as zinc, magnesium, iron and nickel orthophosphates, orthophosphoric acid, acid salts of phosphates which serve to yield orthophosphoric acid in solution such as monosodium, monopotassium and ammonium phosphate, sodium acid pyrophosphate, sodium hemiphosphate; molybdates, such as molybdic acid, molybdic oxide, ferric molybdate; and the like, either alone or in admixture.

The polymeric organic sealing agents are also adapted to be used in combination with conventional conversion coating baths for non-ferrous metals such as aluminum and magnesium. Such baths may include chromate such as chromic acid, potassium or sodium chromate or dichromate and the like; fluoride, such as hydrofluoric acid, potassium acid fluoride, aluminum fluoride and the like; chromate-fluoride combinations and others, as will be readily apparent to those skilled in the art. Specific examples of non-ferrous metals conversion coating baths embodying polymeric organic sealing agents are as follows:

Example 7

| Material component: | Weight percent |
|---|---|
| Orthophosphoric acid (75%) | 15.0 |
| Chromic acid | 1.0 |
| Hydrofluoric acid | 0.3 |
| Styrene heteropolymer of ammonium maleate | 2.0 |
| Water | 81.7 |

Example 8

| Material component: | Weight percent |
|---|---|
| Orthophosphoric acid (75%) | 25.0 |
| Nitric acid | 1.5 |
| Aluminum fluoride | 0.7 |
| Polymeric styrene phosphonic acid | 2.0 |
| Water | 70.8 |

It is possible to incorporate dry lubricants such as colloidal graphite or molybdenum disulfide in the polymeric seal-conversion coating bath and to co-deposit such components with the conversion seal coating to provide a dry film lubricated finish on both ferrous and non-ferrous metals. The following example illustrates a dry film-conversion seal coating composition for ferrous metals:

Example 9

| Material component: | Weight percent |
|---|---|
| Sodium acid pyrophosphate | 0.40 |
| Orthophosphoric acid | 0.15 |
| Manganese carbonate | 0.02 |
| Zinc phosphate | 0.01 |
| Molybdenum oxide | 0.005 |
| Molybdenum disulfide ("micronized") | 0.02 |
| Sodium hemiphosphate | 0.25 |
| Polystyrene sulfonic acid | 0.20 |
| Water | 98.945 |

The following examples illustrate a dry film-conversion seal coating composition for non-ferrous metals:

Example 10

| Material component: | Weight percent |
|---|---|
| Orthophosphoric acid | 15.0 |
| Molybdenum disulfide ("micronized") | 0.1 |
| Chromic acid | 1.0 |
| Hydrofluoric acid | 0.3 |
| Polymeric styrene ammonium sulfonate | 2.0 |
| Water | 81.6 |

Example 11

| Material component: | Weight percent |
|---|---|
| Polystyrene phosphonic acid | 0.40 |
| Molybdenum disulfide ("micronized") | 1.2 |
| Water | 98.4 |

Compositions for making up the above-cited baths may be made in concentrated form either in the form of liquid or in some cases in the form of dry powder. This would be the most convenient form for manufacture and distribution of compositions for imparting conversion-seal coatings. Wide latitude in bath concentrations of the compositions of this invention are permissible. While it is most economical to employ low concentrations (as in the above examples), the concentration of the polymeric sealing agents may be as high as 20% if desired. The optimum proportion of polymeric sealing agent, based upon the conventional phosphate or other conversion coating constituent, is from about 10 to about 20%, but coatings of perhaps less desirable characteristics can be produced using higher or lower relative amounts.

In employing the novel compositions of this invention, the various modes of application for imparting conversion coatings embodying the polymeric sealers would be the same as are currently used for the conventional conversion coatings. For example, the necessary steps include the removal of oily and solid soil from the part to be coated by the use of alkaline cleaners or organic solvent degreaser compositions, followed by rinsing in water and treatment in the conversion coating bath by means of (a) immersion, (b) wipe-on, wipe-off, (c) spray application, or (d) roller coat.

It is possible to impart coatings at the ambient temperature of 75° F. However, improved coatings can be obtained employing bath temperatures in the range of 120–180° F. The treated parts may be water or dilute chromic acid rinsed before drying and/or storage and painting. Weights of coating imparted range from 40 to in excess of 2,000 milligrams per square foot, depending upon the type of metal, the concentration of bath, the time cycle employed and the temperature of application.

The immersion operation is normally carried out in a temperature range of 160–180° F. for an interval which may vary from 1 to 10 or more minutes, depending upon the weight of coating desired. The wipe-on method provides for brushing the conversion composition onto the clean metal and wiping the part to a state of dryness to remove the excess material. This operation is normally carried out at ambient atmosphere temperature. The spray process involves the impingement of the cleaned part with the conversion coating composition at a temperature in the range of 140–180° F. for time intervals that may vary from 30 seconds to 5 minutes. Roller coating applies only to sheet stock and it involves passing the cleaned sheet through a double set of rollers over which is flowed the conversion coating solution. This operation is usually carried out at high speed with the sheets moving at velocities of 40 to 160 feet per minute. The sheet, coating composition or both are heated to 140–180° F.

As a specific example of the process, cold rolled 1018 steel was treated by first cleaning and degreasing in an alkaline emulsion cleanser ("Keylite" M–D–1, in a concentration of 6 oz./gal.) at a temperature of 160° F. for 2 minutes. The parts were rinsed in water at 140° F. for 1 minute and then immersion coated in the bath of Example 2 at 180° F. for 2 minutes. The parts were dried in warm air at 160° F. The coating weight was 220 mg./sq. ft. The coated parts showed significantly improved resistance to corrosion and weathering. Typical data are as follows:

HOURS ASTM SALT SPRAY AS A FUNCTION OF TREATMENT OF COLD ROLL 1018 STEEL

| Cold Roll Steel Cleaned or Degreased | Cold Roll Steel Oiled at Mill | Cold Roll Steel Phosphatized | Cold Roll Steel Phosphatized Seal Treated |
|---|---|---|---|
| 0.30 | 0.50 | 1.0 | 5.5 |

In addition to imparting corrosion resistance to the metal, the conversion coat-seal treatment provides other significant technologic and economic advantages. The seal coating fills the interstices of the conversion coating and fills the surface irregularities of the metal to provide a smooth finish to the metal. This makes it possible to accomplish a material saving in the organic finish required to produce a protective and smooth decorative coating. As much as 0.2–0.5 mils of organic finish can be conserved over that required to adequately coat metal protected by a conversion paint bond coating alone. Additionally, with the co-deposition of the polymeric seal it is possible to obtain conversion coatings of fine grain structure which are amorphous in character. The co-deposited polymeric sealer also provides better resistance to failure of coating on defamation impact and abrsion.

Having fully described my invention, it is to be understood that I do not wish to be limited to the details set forth, but my invention is of the full scope of the appended claims.

I claim:

1. A corrosion protective composition for metals comprising an aqueous coating bath including a major proportion of a water-soluble inorganic component reactive with said metal to provide a corrosion-resistant coating thereon and a minor proportion of from about 10–20% by weight based on said water-soluble inorganic component of a polymeric material containing a strong polar grouping selected from the group consisting of polystyrene sulfonic acid, polystyrene phosphonic acid, styrene heteropolymer of maleic acid, styrene heteropolymer of ammonium maleate and polystyrene sulfonic acid ammonium salt.

2. A composition as claimed in claim 1 in which said polymeric material is polystyrene sulfonic acid.

3. A composition as claimed in claim 1 in which said polymeric material is polystyrene phosphonic acid.

4. A composition as claimed in claim 1 in which said polymeric material is styrene heteropolymer of maleic acid.

5. A composition as claimed in claim 1 in which said polymeric material is styrene heteropolymer of ammonium maleate.

6. A composition as claimed in claim 1 in which said polymeric material is polystyrene sulfonic acid ammonium salt.

7. The composition of claim 1 in which said inorganic component includes a phosphate.

8. The composition of claim 1 in which said inorganic component includes orthophosphoric acid.

*9. A corrosion protective composition for metals comprising an aqueous coating bath including a major proportion of a water-soluble inorganic component reactive with said metal to provide a corrosion-resistant coating thereon and a minor proportion of from about 10–20% by weight based on said water-soluble inorganic component of a polymeric material having the generic formula:*

$$(-R-X)_n$$

*where —R—X represents a polymerizable monomer in which —R— is a vinyl-substituted aryl group and X is a strong polar group selected from the group consisting of a dicarboxylic acid, a dicarboxylic acid ammonium salt, a sulfonic acid and a phosphonic acid capable of forming a molecular bond with a metal and "n" is an integer greater than 1.*

*10. A composition as claimed in claim 9 in which said inorganic component includes a phosphate.*

*11. A composition as claimed in claim 9 in which said inorganic component includes orthophosphoric acid.*

*12. A corrosion protective composition for metals comprising an aqueous coating bath including a major proportion of a water-soluble inorganic component reactive with said metal to provide a corrosion-resistant*

*coating thereon and a minor proportion of from about 10–20% by weight based on said water-soluble inorganic component of a polymeric material having the generic formula:*

$$(-R-X)_n$$

*where —R—X represents a polymerizable monomer in which —R— is a vinyl-substituted aryl group and X is a strong polar group selected from the group consisting of maleic acid, maleic acid ammonium salt, a sulfonic acid and a phosphonic acid capable of forming a molecular bond with a metal and "n" is an integer greater than 1.*

References Cited in the file of this patent or the original patent

| | | |
|---|---|---|
| Re. 24,017 | Henricks | June 7, 1955 |
| 2,160,061 | Doolittle | May 30, 1939 |
| 2,221,968 | Friedmann | Nov. 19, 1940 |
| 2,337,424 | Stoner | Dec. 21, 1943 |
| 2,454,284 | Kirk | Nov. 23, 1948 |
| 2,712,511 | Orozco | July 5, 1955 |

FOREIGN PATENTS

| | | |
|---|---|---|
| 673,638 | Great Britain | June 11, 1952 |
| 1,026,317 | France | Feb. 4, 1953 |
| 1,093,981 | France | Dec. 1, 1954 |